United States Patent
Petillo et al.

(10) Patent No.: US 9,565,220 B2
(45) Date of Patent: Feb. 7, 2017

(54) SYSTEMS AND METHODS FOR PREVENTING FRAUD IN AN INTERNET PROTOCOL TELEPHONY SYSTEM

(75) Inventors: Richard Petillo, Long Valley, NJ (US); Vishal Patel, New Brunswick, NJ (US); William Lonergan, Cranford, NJ (US); Nirav Kadakia, Old Bridge, NJ (US); Michael South, Jackson, NJ (US); Zhiyu Guo, East Brunswick, NJ (US)

(73) Assignee: VONAGE BUSINESS INC., Atlanta, GA (US)

( * ) Notice: Subject to any disclaimer, the term of this patent is extended or adjusted under 35 U.S.C. 154(b) by 1187 days.

(21) Appl. No.: 12/971,747

(22) Filed: Dec. 17, 2010

(65) Prior Publication Data

US 2011/0149955 A1    Jun. 23, 2011

Related U.S. Application Data

(60) Provisional application No. 61/284,465, filed on Dec. 18, 2009.

(51) Int. Cl.
  *H04L 29/06* (2006.01)
  *H04M 3/38* (2006.01)
  *H04M 7/00* (2006.01)

(52) U.S. Cl.
  CPC ....... *H04L 65/1076* (2013.01); *H04L 65/1069* (2013.01); *H04M 3/38* (2013.01); *H04M 7/0078* (2013.01); *H04L 63/10* (2013.01)

(58) Field of Classification Search
  USPC .............................. 370/352; 455/413; 705/26
  See application file for complete search history.

(56) References Cited

U.S. PATENT DOCUMENTS

2005/0177437 A1\* 8/2005 Ferrier ............................ 705/26
2011/0294472 A1\* 12/2011 Bramwell et al. ............ 455/413

\* cited by examiner

*Primary Examiner* — Khaled Kassim
(74) *Attorney, Agent, or Firm* — Nixon & Vanderhye P.C.; Joseph Pagnotta

(57) ABSTRACT

Systems and methods for preventing fraud in an IP based telephony system include noting when an IP based telephony device sent to a new customer is not installed and registered with the system. If a new customer never attempts to register a device which was sent to the new customer, the system will assume that the new customer submitted false or erroneous address information. A new customer is prevented from taking any actions that would result in new charges until the new customer has registered an IP device sent to the new customer. Likewise, the system will act to prevent a phone verification service from reaching a new customer at his newly assigned telephone number until after the new customer has registered an IP based telephony device sent to the new customer.

6 Claims, 5 Drawing Sheets

SYSTEMS AND METHODS FOR PREVENTING FRAUD IN AN INTERNET PROTOCOL TELEPHONY SYSTEM

CROSS-REFERENCES TO RELATED APPLICATIONS

The present application claims priority to the filing date of U.S. Provisional Application Ser. No. 61/284,465 filed Dec. 18, 2009, the entire disclosure of which is hereby incorporated by reference.

BACKGROUND OF THE INVENTION

The invention relates to methods of preventing new users of an Internet Protocol (IP) based telephony service from committing fraudulent acts.

VoIP is a technological development in the field of telecommunications that is utilized to transmit voice conversations over a data network using Internet Protocol (IP) data packets rather than the existing and traditional telecommunications systems more commonly referred to as the Public Switched Telephone Network (PSTN) or Plain Old Telephone Service (POTS). Entities (e.g., businesses or individuals) implement VoIP by purchasing and installing the necessary equipment (e.g., one or more Customer Premise Equipment (CPE) devices) to access a VoIP service provider. The entities then activate this telecommunication service via a broadband Internet connection.

Transmitting voice calls over a data network is typically accomplished by converting analog voice signals into data packets. Transporting calls over computer networks allows phone calls to be transported more efficiently. Additionally, because computer network infrastructures are already in place, the cost of transporting calls over computer networks is greatly minimized. As a result, VoIP services have become pervasive.

When a new customer wishes to obtain VoIP telephony services from a VoIP service provider, the new customer would typically access the service provider through a website on the Internet, or by calling the service provider. The new customer would perform a registration process that includes providing the VoIP service provider with personal information, and making an initial payment to establish a new account. At the conclusion of the registration process, the VoIP service provider would assign a new telephone number to the customer, and a voice mailbox tied to that telephone number would be created.

In addition, the VoIP service provider would normally ship one or more IP based telephony devices to the new customer's address to provide the new customer with a means to access and use telephony services provided by the system. The IP based telephony device could be an IP telephone, or a Terminal Adapter (TA) that allows the user to make use of a normal analog telephone. The customer would receive the IP based telephony device, and the customer would connect the device to an Internet service. Typically, the user would then cause a registration process to occur so that the VoIP service provider registers the new IP based telephony device as corresponding to the new customer, and to his assigned telephone number.

In addition to the use of IP based telephony devices, customers can also install IP telephony software on general purpose computers, PCs, laptops and other devices that are connected to the Internet, and the computer can then be used to place and receive VoIP calls. Such software allows a customer to implement a "soft-phone" client on their computer which is used to access and use the telephone services.

Once a new customer has registered with a VoIP service provider, the customer will have nearly immediate access to telephony services with the newly assigned telephone number. For instance, if the new customer has installed IP based telephony software on a computer, the customer may be able to immediately place and receive calls using the newly assigned telephone number. In addition, the new customer could issue a call forwarding instruction so that any calls placed to his new number are forwarded to another telephone number. Further, people would be able to call the new telephone number and leave messages for the new customer in his new voice mailbox. And the customer would be able to access such voice messages. All of these actions could be accomplished before the new customer receives, installs and registers IP based telephony devices that are shipped to the customer after the registration process.

Because customers of a VoIP service utilize data communications to place and receive calls and to obtain other telephony services, the customers are not tied to a single physical location. Instead, customers can obtain VoIP telephony services from virtually any location where they can establish a data connection to the Internet. For instance, a customer who establishes a VoIP account in the United States could connect a VoIP enabled phone to the Internet in a country outside the United States, and still place and receive calls using their assigned telephone number. Likewise, the customer could access and play voicemail recordings that have been left in a voice mailbox established for the customer from any location in the world.

A recurring problem with VoIP services relates to the flexibility that users have regarding where they can access their VoIP telephony services. For example, an individual can subscribe to the VoIP service from an unknown location and remain anonymous while they use the VoIP services. Although new users are supposed to identify their actual name and address during the registration process, it is possible for a new customer to provide fraudulent information. So long as the initial payment provided during the registration process is received, a VoIP service provider will establish a new account for a customer, even where the information provided by the registering individual turns out to be false. Even the initial payment could be made via one or more stolen credit cards.

An individual who registers with fraudulent information will still get an assigned telephone number, as well as a voice mailbox. Until the VoIP service provider is able to discover the fraud, the individual will have access to VoIP services such as call forwarding, voicemail, a softphone client and the like. Attempts to thwart these types of fraudulent activities are not always successful because they require a period of account activity surveillance and vetting that is labor intensive and not always accurate. Additionally, previous types of fraud control such as IP address blocking are ineffective because of the technological capability of anonymizing IP addresses through various services or products.

One particular application of this fraudulent activity is in the attempted establishment of Phone Verified Accounts (PVAs) with an online classified service such as Craigslist and AutoTrader. Such online classified and marketing services attempt to prevent fraud by checking when new users request placement of a listing to ensure that the information provided by the new user is valid. Often, the only information given by a new user is a telephone number that people can call to inquire about purchasing an item the new user has advertized for sale.

Typically, the online classified service will have a third party verification service call the telephone number provided by the user, and the verification service will deliver an identification number to the new user. If no one answers such a call, the verification service will leave the identification number in a voicemail recording. The new user will then access the online classified service via the Internet, or via telephone, and provide the identification number received from the verification service. Once this occurs, the new user will have established a "Phone Verified Account" (PVA), and the user's advertisement will be posted online. The verification process attempts to ensure that the telephone number listed in an advertisement is associated with a legitimate user.

A typical fraudulent attempt to set up a Phone Verified Account with an online classified advertizing service would start with an individual first establishing a new VoIP account with a VoIP service provider. During the registration process, the individual would allege to be at a US location (address). The individual uses a stolen credit card to satisfy the initial payment. And once the initial payment goes through, they are given a Direct Inward Dialing (DID) telephone number, and a voice mailbox. The voice mailbox will be accessible via the Internet, or through a telephone voicemail interface.

The individual would then apply to sell goods and/or services through an online advertising service. To authenticate themselves, the individual gives the online advertising service the DID telephone number of the fraudulently established VoIP account.

The online advertiser would then send the DID phone number they have been given by the individual, as well as a PIN number, to an account verification service. The account verification service generates an automated call to the DID number to authenticate the individual. When the call is answered, the verification service advises the answering party that this is a verification call and provides the PIN number from the online advertiser. In some instances, the call may go into the newly established voicemail account. In other instances, the individual who established the VoIP account may have issued a call forwarding instruction that results in calls to the DID number being forwarded to another number. Regardless, the account verification service will leave the PIN number on the voicemail or give it to the person who answers a forward-to number.

The individual would then use the PIN number to verify their account with online advertiser. The individual will then have a working "Phone Verified Account".

This PVA can then be used by the individual himself to commit further fraudulent acts, or the individual can sell the PVA over the Internet for use by others in committing fraudulent acts. Typically this involves scamming unsuspecting buyers looking for merchandise on the online advertiser's website. A scam could include an instruction to a buyer to send in a deposit to hold a new car which is being offered at a steep discount. Alternatively, the scam could involve asking buyers to pre-pay for goods that are never delivered.

DETAILED DESCRIPTION

Figure 1:
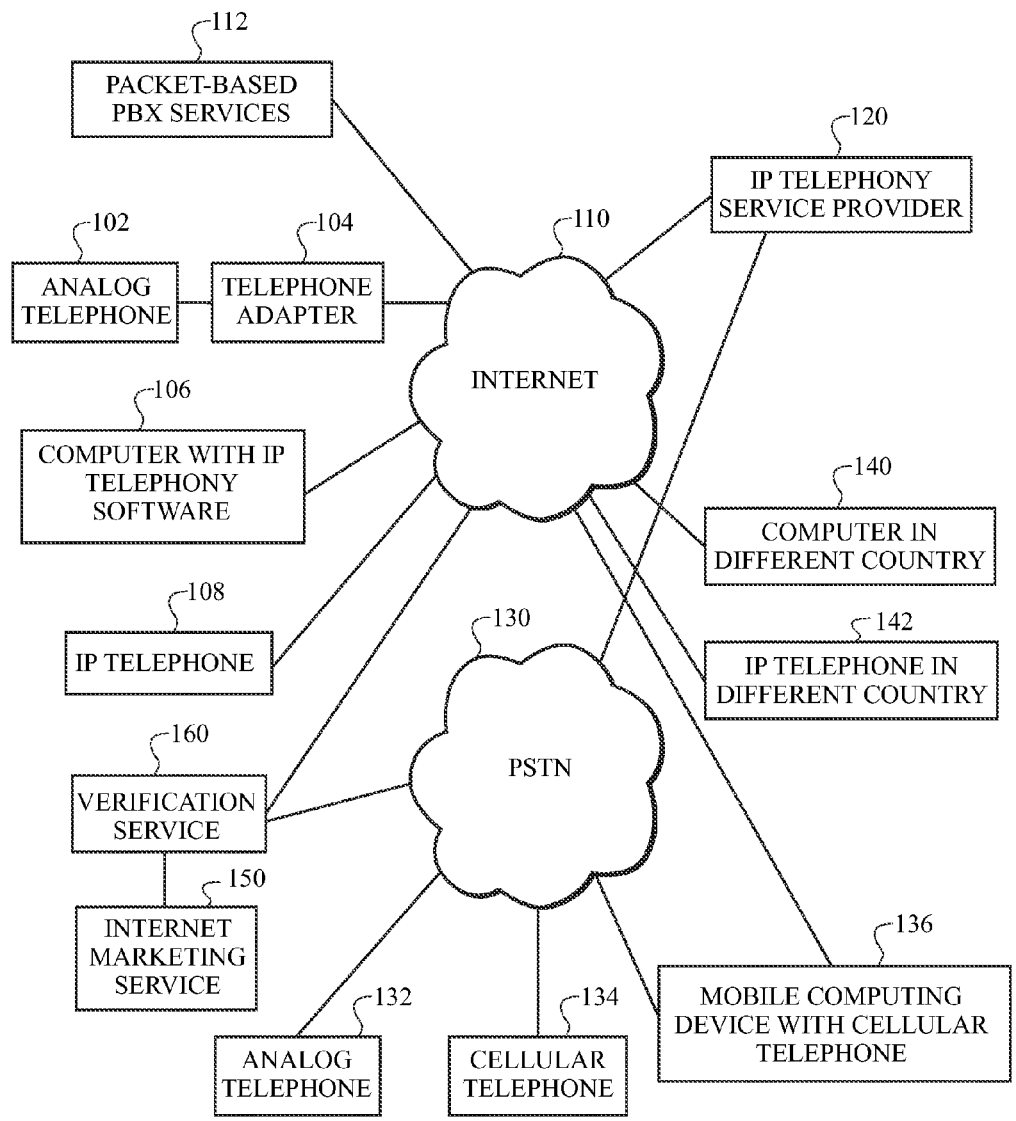
FIG. 1 is a diagram illustrating various elements which can be involved in an IP telephony service.

Various different elements which can be a part of and which can interact with an IP based telephony service are illustrated in FIG. 1. As shown therein, the IP telephony service provider 120 enables connection of telephone calls between its own customers and other parties. The IP telephony service provider 120 is connected to both the Internet 110, and to the publicly switched telephone network (PSTN) 130.

Customers of the IP based telephony service can access the system using an IP telephone 108 connected to the Internet 110. Such an IP telephone could be connected to an Internet service provider via a wired connection or via a wireless router. In some instances, the IP telephone could make use of a cellular telephone system to access the Internet.

Alternatively, a customer could utilize a normal analog telephone 102 which is connected to the Internet 110 via a telephone adapter 104. The telephone adapter would basically function to convert analog signals from the telephone into data signals that pass over the Internet 110, and visa versa.

In addition, a customer could utilize a soft-phone client running on a computer 106 to place and receive IP based telephone calls, and to access other IP telephony services.

A third party using an analog telephone 132 which is connected to the PSTN 130 may call a customer of the IP based telephony service provider 120 who uses an IP telephone 108 connected to the Internet 110. In this instance, the call would initially be connected from the analog telephone 132 to the PSTN 130, and then from the PSTN 130 to the IP telephone 108. In some instances, the connection between the PSTN and the IP telephone 108 might run directly from the PSTN 130 to the Internet 110 and then to the IP telephone 108. In other instances, the telephone call could be routed from the PSTN 130 to the IP based telephony service provider 120 via a direct data link, and the IP based telephony service provider 120 could then route the call to the IP telephone 108 through the Internet 110. Additionally, the IP telephone 108 could be one or more servers 112 connected to the Internet 110 to provide packet-based PBX-type services to the customer of the IP based telephony service provider. One example of such a server is a softswitch running a software implementation of a telephone private branch exchange (PBX) such as Asterisk®. Asterisk is developed by Digium, Inc., a communications technology company based in Huntsville, Ala., and is released under a dual license model, using the GNU General Public License (GPL) as a free software license and a proprietary software license to permit licensees to distribute proprietary, unpublished system components.

In addition, cellular telephones 134 could access customers of the IP based telephony service through the cellular telephone network, which in this instance is considered part of the PSTN 130. In addition, mobile computing devices which include cellular telephone capabilities could also be used to place telephone calls to customers of the IP based telephony service. A mobile computing device 136 as illustrated in FIG. 1 might connect to the PSTN 130 using its cellular telephone capabilities. However, such devices might also have the ability to connect with a wireless data router to connect the mobile computing device 136 directly to a data network, such as the Internet 110. In this instance, communications between the mobile computing device 136 and other parties could be entirely carried by data communications which pass from the mobile computing device directly to a data network 110.

As explained above, users of the IP telephony service are able to access the service from virtually any location where they can connect to the Internet. Thus, a customer could register with an IP telephony service provider in the U.S., and that customer could then use an IP telephone 142 located in a country outside the U.S. to access the services. Likewise, the customer could also utilize a computer 140 outside the U.S. that is running a soft-phone client to access the IP telephony services.

Figure 2A:
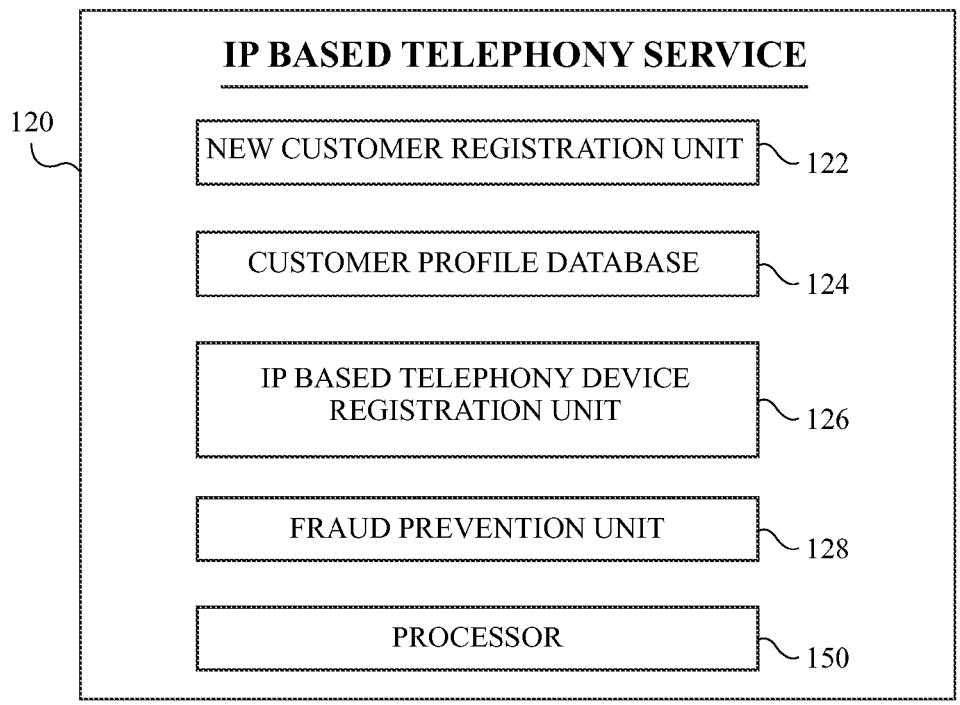
FIG. 2A illustrates elements used to implement a typical IP based telephony service.
Figure 2B:
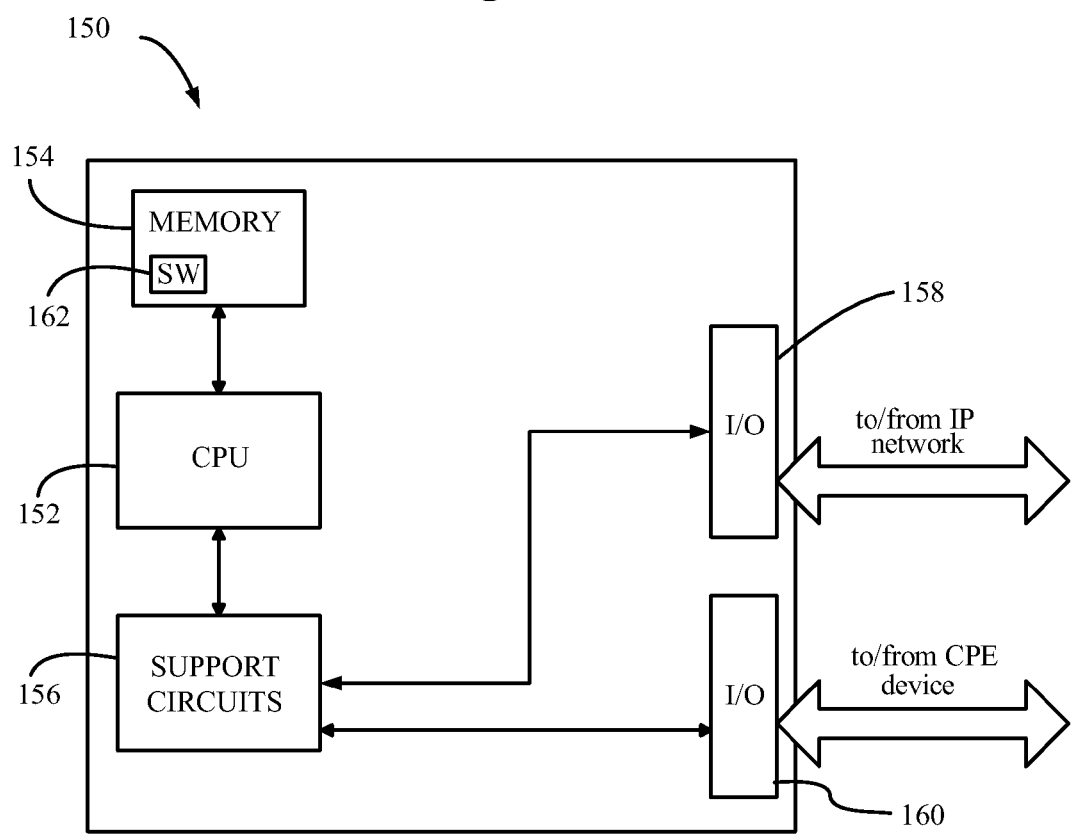
FIG. 2B illustrates elements of a computer processor that can be used as part of the IP based telephony service illustrated in FIG. 2A.

FIG. 2A illustrates various elements that can be used by an IP telephony service provider to implement and provide IP telephony services. FIG. 2B illustrates elements of a computer processor that can be used as part of the IP telephony service to accomplish various functions.

The processor 150 shown in FIG. 2B may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2B; however, they may alternately be a single bus structure without degrading or otherwise changing the intended operability of the processor 150.

In FIG. 2A, the processor 150 and its operating components and programming, as described in detail below, are shown as a single entity. However, the processor 150 may also be one or more processors, controllers and programming modules interspersed around the IP based telephony service 120, each carrying out a specific or dedicated portion of the functions performed by the IP based telephony Service 120.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the present invention, and is generally stored in the memory 154. The software routine 162 may also be stored and/or executed by a second CPU (not shown) that is remotely located from the hardware being controlled by the CPU 152.

The software routine 162, when executed by the CPU 152, transforms the general purpose computer into a specific purpose computer that performs one or more functions of the IP based telephony service 120. Although the processes of the present invention may be discussed as being implemented as a software routine, some of the method steps that are disclosed therein may be performed in hardware as well as by a processor running software. As such, the invention may be implemented in software as executed upon a computer system, in hardware as an application specific integrated circuit or other type of hardware implementation, or a combination of software and hardware. The software routine 162 of the present invention is capable of being executed on any computer operating system, and is capable of being performed using any CPU architecture.

Returning now to a description of the other elements of the IP based telephony service 120, and as explained above, when a new customer wishes to establish a new account, a new customer registration unit 122 could be used to register the customer. And during that registration process, the customer might provide fraudulent information. Further, the new customer could utilize stolen credit card information to make an initial payment to register as a new customer. During the registration process, the new customer registration unit 122 would assign a new telephone number to the new customer, and a voicemail box associated with the newly assigned telephone number would created.

In a typical IP based telephony service, a customer is able to place an unlimited number of calls to telephone numbers in locations within their basic calling area. For IP based telephony service providers in the United States, this typically means that newly registered users can place an unlimited number of telephone calls to any party within the United States. And the initial payment made during the registration process covers this service for a defined period of time, typically one month.

On the other hand, if a customer places calls to telephone numbers located outside the basic calling plan area, the customer will be charged additional amounts for such calls. Also, utilization of certain telephony services might incur charges in addition to the basic plan amount. Examples of such services are the use of directory assistance, or operator assisted calls. Further, if a customer calls a toll number, such as a number with an area code beginning with 9XX, the toll charges associated with the call would be charged back to the customer.

During the new customer registration process, a customer profile will be created for the new user. The customer profile information can be stored in a customer profile database 124, which is also part of the IP based telephony service 120. The customer profile information will typically include the information provided by the customer during the initial registration process, even if it is fraudulent. Also, the customer profile information would also typically indicate what services the customer is authorized to access.

As also explained above, when a new customer initially registers with an IP telephony service, usually it is necessary for the new customer to receive and install customer premise equipment (CPE). Typically, this is in the form of a telephone adapter which is used to connect a normal analog telephone to a broadband data connection, or in the form of an IP telephone. Regardless, the IP telephony service provider would ship the device(s) to the new customer at the address provided by the customer during the initial registration process.

When a customer receives a device sent from the IP telephony service provider, the customer will connect the device to an Internet service. The device would then be registered with the IP telephony service provider via communications passing between the device itself and an IP based telephony device registration unit 126 of the IP telephony service 120. It may be necessary for the new customer to take proactive steps to cause the registration process to occur. Alternatively, as soon as a new piece of IP based telephony equipment is connected to a broadband service, and powered on, the device itself may automatically conduct the registration process by communicating with the registration unit 126.

Figure 3:
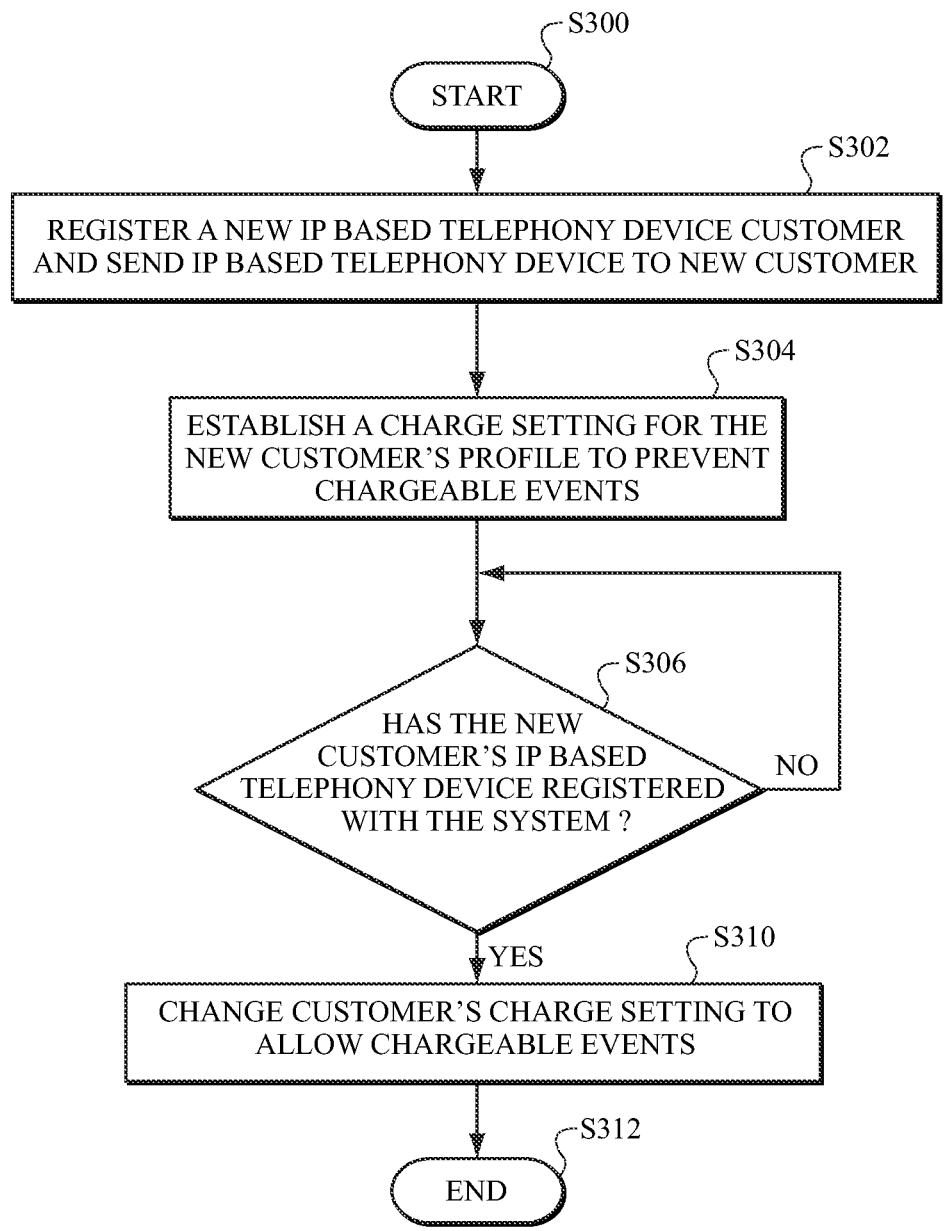
FIG. 3 illustrates steps of a method for preventing fraud in an IP telephony service.

FIG. 3 illustrates a first method for preventing fraudulent activity on an IP based telephony service. As illustrated in FIG. 3, in step S302, a new customer would register with an IP based telephony service. The IP based telephony service would then ship an IP based telephony device to the new customer at the address provided by the customer during the registration process.

In step S304, the IP based telephony service would configure the new customer's profile information to indicate that the customer should not be allowed to conduct charge generating actions. In other words, the system would mark the new customer's profile with a charge setting that indicates that the customer is not yet authorized to perform charge generating acts, such as placing a call to a telephone number outside his calling area, or placing a toll call.

As illustrated in step S306, the IP based telephony service would periodically check to determine if an IP based telephony device that was sent to the customer has been registered with the system by the registration unit 126. If the IP based telephony device sent to the customer has not yet been registered, no action occurs, and the method loops back to the top of step S306. As a result, the charge setting in the customer's profile will continue to reflect that the customer is not authorized to conduct chargeable actions.

If the new customer provided fraudulent address information when he registered with the service, the IP based telephony device sent to that address will never be installed and registered with the service. As a result, the customer will never be authorized to take any actions which would result in charges being applied to the new customer's account.

On the other hand, if the new customer provided accurate and valid address information, the new customer would ultimately receive the IP based telephony device. The new customer would install the device and register it with the IP based telephony system shortly after registering with the service. And as a result, at some point in time one of the periodic checks which occur in step S306 will result in the method moving on to step S310. In step S310, the system would update the customer's profile information so that the charge setting indicates that the customer is authorized to conduct actions which would result in charges being applied to the customer's account.

With a method as illustrated in FIG. 3, any new customers who provide fraudulent address information during registration will be prevented from running up charges which they never intend to pay. On the other hand, new users who provide accurate address information, and who ultimately receive and register an IP based telephony device with the service, will be allowed to begin performing chargeable actions as soon as they have registered the IP based telephony device.

Figure 4:
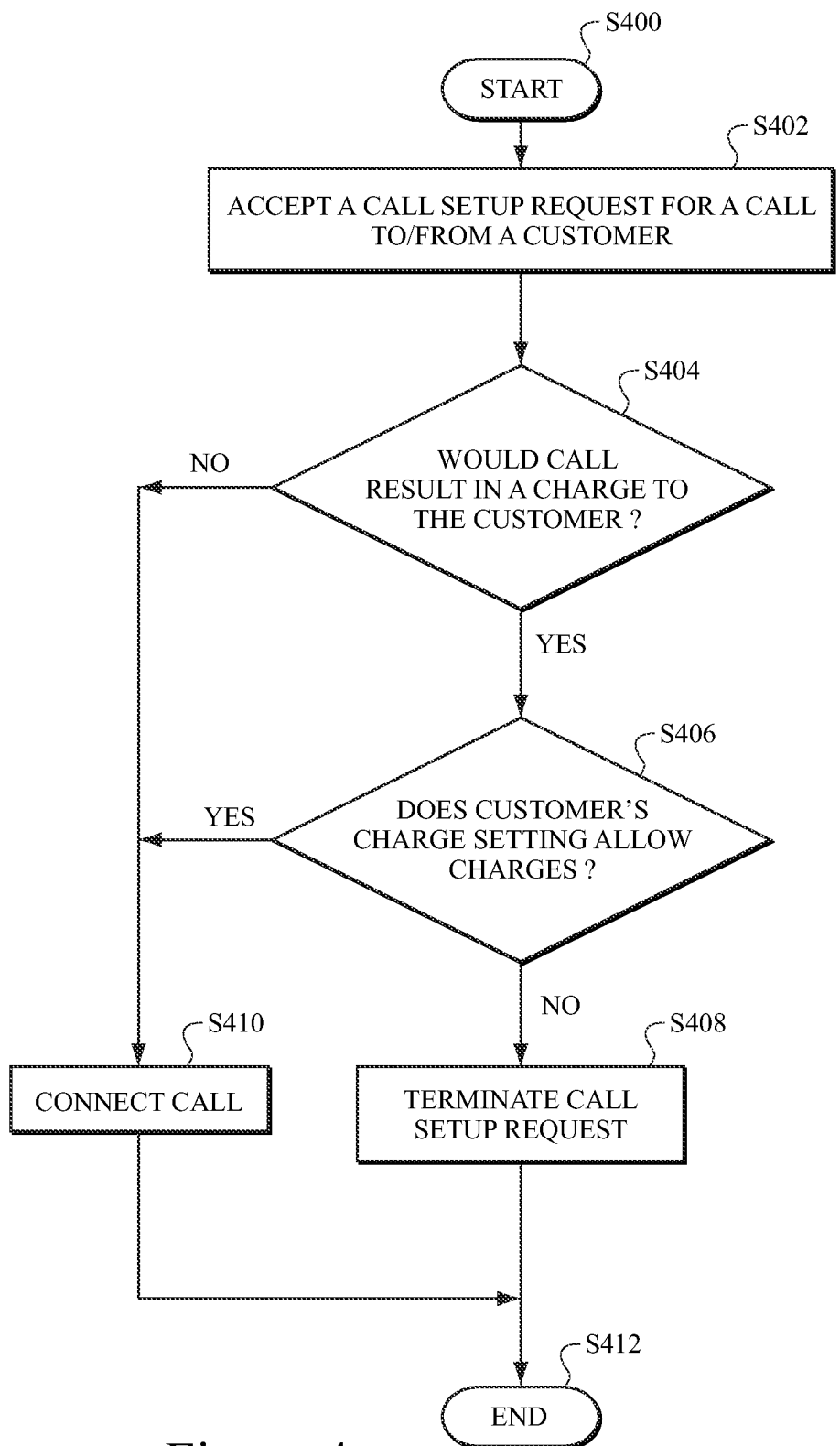
FIG. 4 illustrates steps of another method for preventing fraud in an IP based telephony service.

Another method for preventing fraudulent activity is illustrated in FIG. 4. The steps of this method would be performed by the IP telephony service each time that a call setup request is made to either complete a call to a new customer's number or to complete a call from a new customer's number to a third party.

In step S402, the system would accept a call setup request for a call that is either from a customer's number, or is to be completed to a customer's number. In step S404, the system would determine if completing the requested call would result in charges being applied to the customer's account. If not, in step S410, the system would go ahead and connect the call as requested.

On the other hand, if completing the call would result in charges being applied to the customer's account, the method would proceed to step S406 where the system would determine if the customer's profile indicates that he is authorized to conduct chargeable actions. If the customer is authorized to conduct chargeable actions, the method would again proceed to step S410 and the call would be connected.

If the system determines in step S406 that the customer is not yet authorized to conduct chargeable actions, the method would proceed to step S408 where the call set up request would be terminated without completion of the call. As explained above, a customer's profile could be marked to indicate that the customer is not authorized to conduct chargeable actions because the customer has not yet registered a device that was sent to the customer after an initial registration process. Thus, a method as illustrated in FIG. 4 would prevent a fraudulent customer from setting up a new account and then running up charges that the customer never intends to pay.

Figure 5:
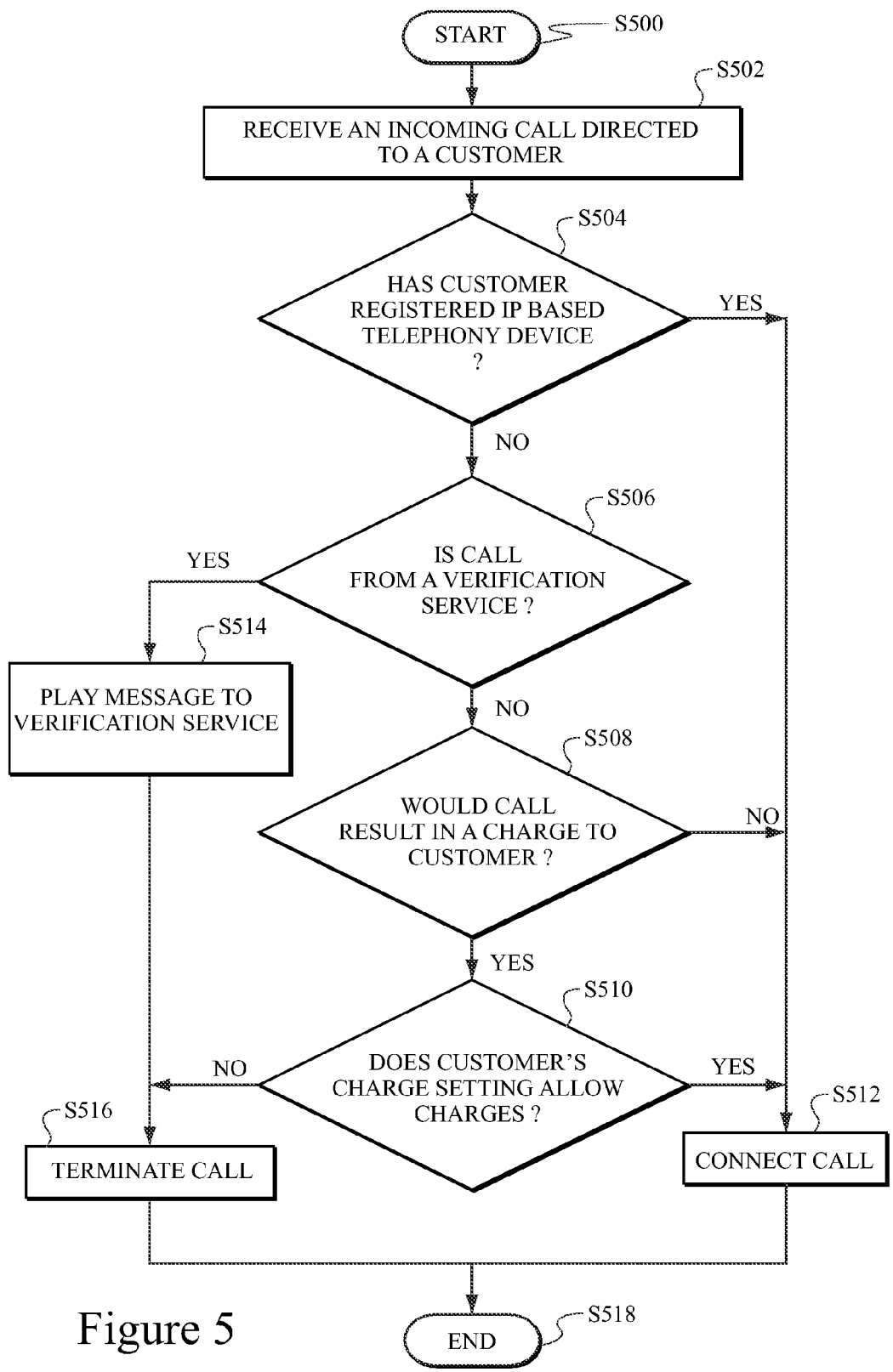
FIG. 5 illustrates steps of another method for preventing fraud in an IP based telephone service.

FIG. 5 illustrates steps of another method of preventing fraud. The method illustrated in FIG. 5 helps to deal with the situation where a fraudulent new customer sets up a new IP telephony service account in order to then use the newly assigned telephone number to set up a phone verified account with an online marketing service provider.

This method would start in step S502 where the system would receive a call setup request to complete a call to one of the system's customers. In step S504, the system would check to determine if that customer has yet registered an IP based telephony device that was sent to the address provided by the customer during the initial registration process. If the customer has already received, installed and registered the IP device that was sent to the customer, the method would proceed immediately to step S512 and the call would be connected.

On the other hand, if the customer provided fraudulent address information during the initial registration process, any IP based telephony equipment sent to the address provided by the customer would not have been registered by the system. As a result, in step S504, the system would determine that no IP based telephony device has been registered for that customer, and the method would proceed on to step S506. In step S506, the telephone number of the calling party would be checked to determine if the telephone call has been placed from a known verification service.

Verification service providers are used by the majority of online classified advertising service providers to help conduct the phone verification process described above. And the calls made by verification service providers all typically come from only a few known telephone numbers. As a result, it is relatively quick and easy to compare the telephone number of the calling party to a list of telephone numbers which are used by known verification service providers.

If the system determines in step S506 that the incoming telephone call is coming from a telephone number of a verification service provider, the system would play a message to the verification service in step S514. The message could indicate that the telephone call is being placed to a newly registered user who has not yet completed the registration process. The call would then be terminated in step S516 without connecting the call to the called party. This would prevent the verification service from communicating a PIN to the fraudulent customer, which would have allowed the fraudulent customer to set up a phone verified account with the online classified service.

On the other hand, if the system determines in step S506 that the incoming call is from a telephone number which is not associated with a verification service, the method would proceed on to step S508, where the system would determine whether completing the call to the customer would result in charges being applied to the customer's account. If the system determines in step S508 that completing the call would not be a chargeable action, the method would proceed on to step S512 and the call will be connected.

If completing the call would be a chargeable event, the method would proceed to step S510, where the system would determine whether the customer's charge setting allows the customer to take chargeable actions. If not, the method would proceed to step S516 and the call would be terminated. If the customer's profile information indicates that the customer is authorized to conduct chargeable actions, the method would proceed on to step S512 and the call would be connected.

A method as illustrated in FIG. 5 provides a mechanism for preventing verification services from leaving the information required to set up a phone verified account. For this reason, once the existence and use of a method as illustrated in FIG. 5 becomes known to those individuals who attempt to set up fraudulent phone verified accounts, it is anticipated that such fraudulent users would no longer even bother to set up a fraudulent account with the IP based telephony service.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combinations, and those variations and modifications would fall and within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of preventing fraud in an Internet Protocol (IP) based telephony service, comprising:
   receiving a call setup request to complete a call to or from a customer of the IP telephony service;
   determining, with a processor, if completing the requested call would result in charges being owed by customer;
   determining, with a processor, if the customer is authorized to conduct chargeable calls, wherein the determination of whether the customer is authorized to conduct chargeable calls is a determination about whether the customer is authorized to conduct chargeable using a soft phone client associated with the customer, and wherein the determination is based upon whether an IP based telephony device sent to the customer has been registered by the IP telephony service;
   completing the requested call if the requested call would not result in charges being owed by the customer, or if the customer is authorized to conduct chargeable calls; and
   terminating the call setup request without completing the call if the customer is not authorized to conduct chargeable calls and completing the call would result in charges being owed by the customer.

2. A method of preventing fraud in an Internet Protocol (IP) based telephony service, comprising:
   receiving a call setup request to complete a call from a calling party to a customer of the IP telephony service;
   determining, with a processor, if an IP based telephony device sent from the IP telephony service to the customer has been registered with the IP telephony service;
   determining, with a processor, if the calling party's telephone number is associated with a verification service; and
   playing a fraud prevention message to the calling party and then terminating the call setup request without completing the call if the calling party's telephone number is associated with a verification service and the IP based telephony device sent from the IP telephony service to the customer has not been registered with the IP telephony service.

3. The method of claim 2, further comprising completing the call to the service customer if the calling party's telephone number is associated with a verification service and the IP based telephony device sent from the IP telephony service to the customer has been registered with the IP telephony service.

4. The method of claim 2, further comprising completing the call to the service customer if the calling party's telephone number is not associated with a verification service and the IP based telephony device sent from the IP telephony service to the customer has not been registered with the IP telephony service, but completing the call would not result in charges being owed by the customer.

5. The method of claim 2, further comprising terminating the call setup request without completing the call if the calling party's telephone number is not associated with a verification service and the IP based telephony device sent from the IP telephony service to the customer has not been registered with the IP telephony service but completing the call would result in charges being owed by the customer.

6. A method of preventing fraud in an Internet Protocol (IP) based telephony service, comprising:
   sending a new customer an IP based telephony device;
   setting a profile for the new customer to reflect that the new customer is not authorized to perform chargeable actions, wherein the setting step comprises setting the profile for the new customer to indicate that the new customer is not authorized to use premium rate services;
   registering, with a processor, the IP based telephony device sent to the new customer after the new customer connects the IP based telephony device to a data network that communicates with the IP telephony service; and
   re-setting the profile for the new customer to reflect that the new customer is authorized to perform chargeable actions at least using a soft phone client associated with the new customer after the IP based telephony device sent to the new customer has been registered.

* * * * *